May 16, 1933. A. R. WELCH 1,909,791
DOWEL PINNING MACHINE
Filed Feb. 23, 1932 5 Sheets-Sheet 1
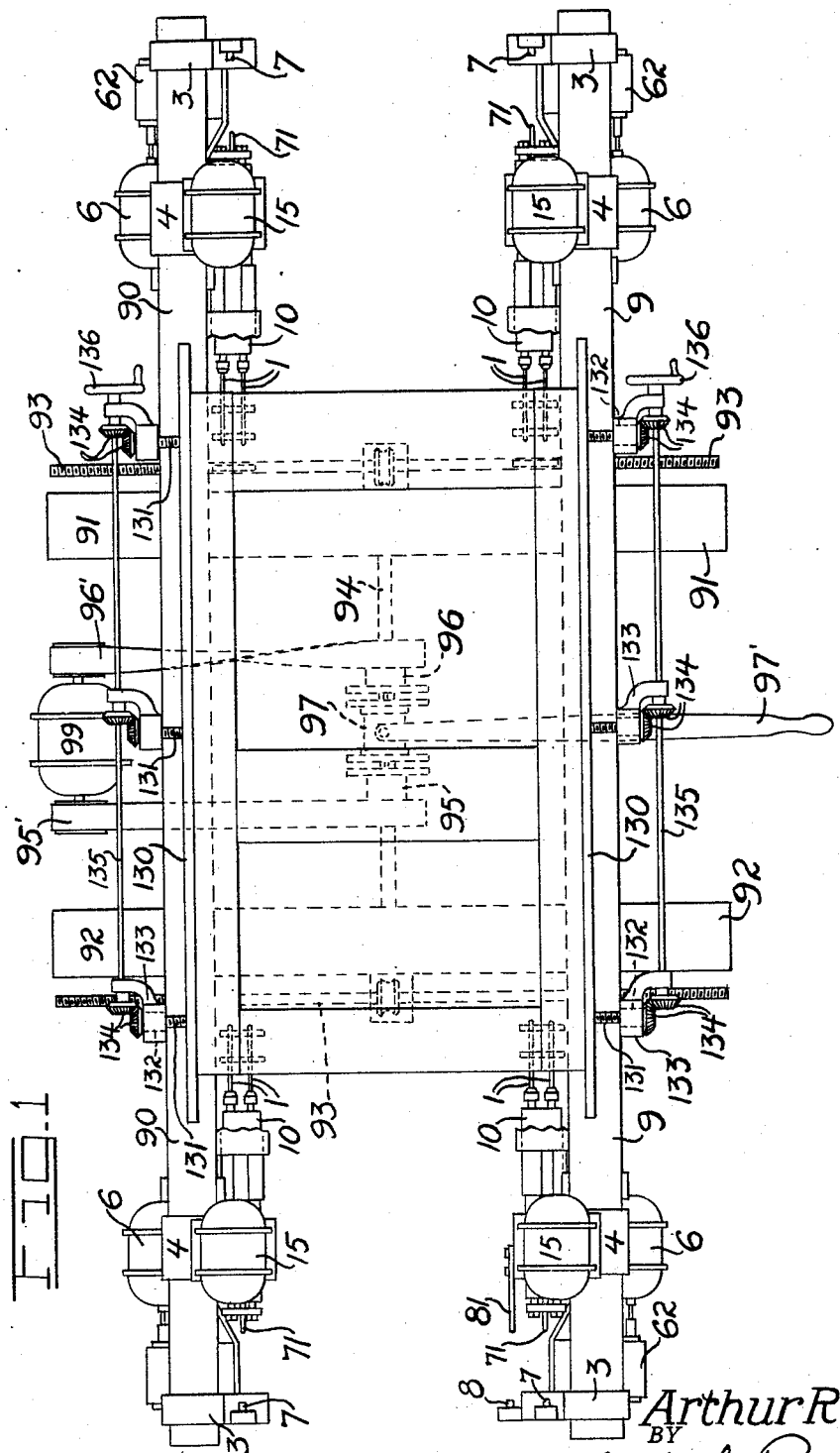
INVENTOR
Arthur R. Welch
BY
Charles L. Reynolds
ATTORNEY

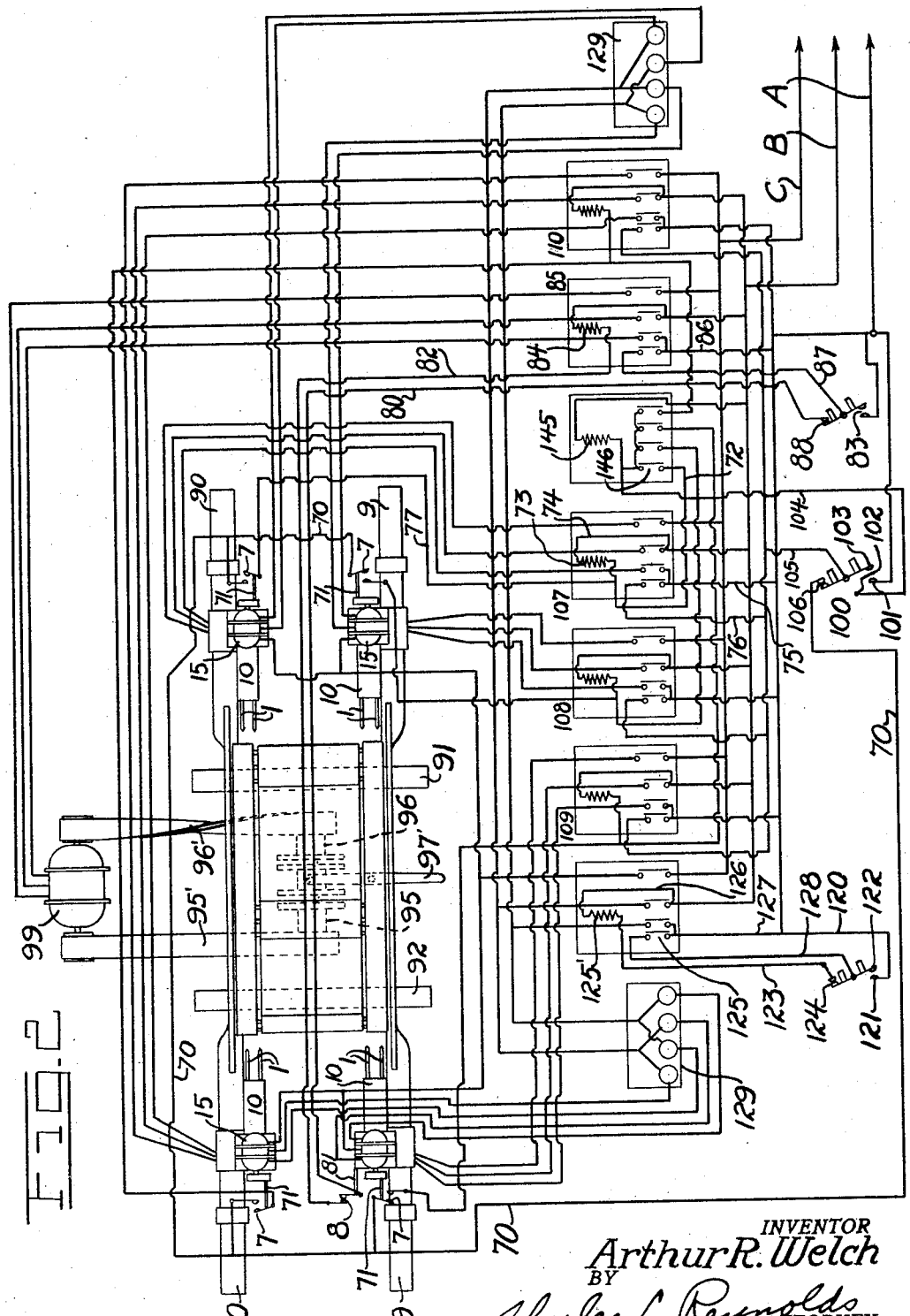

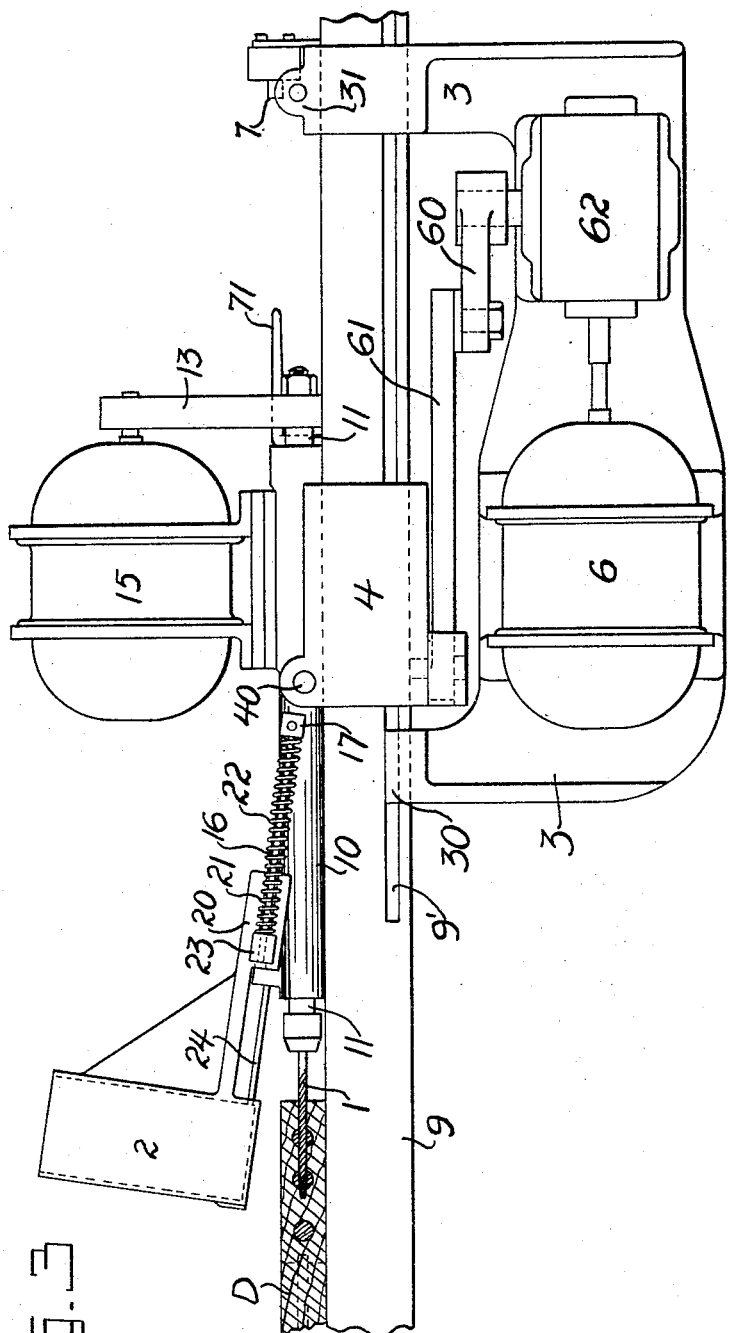

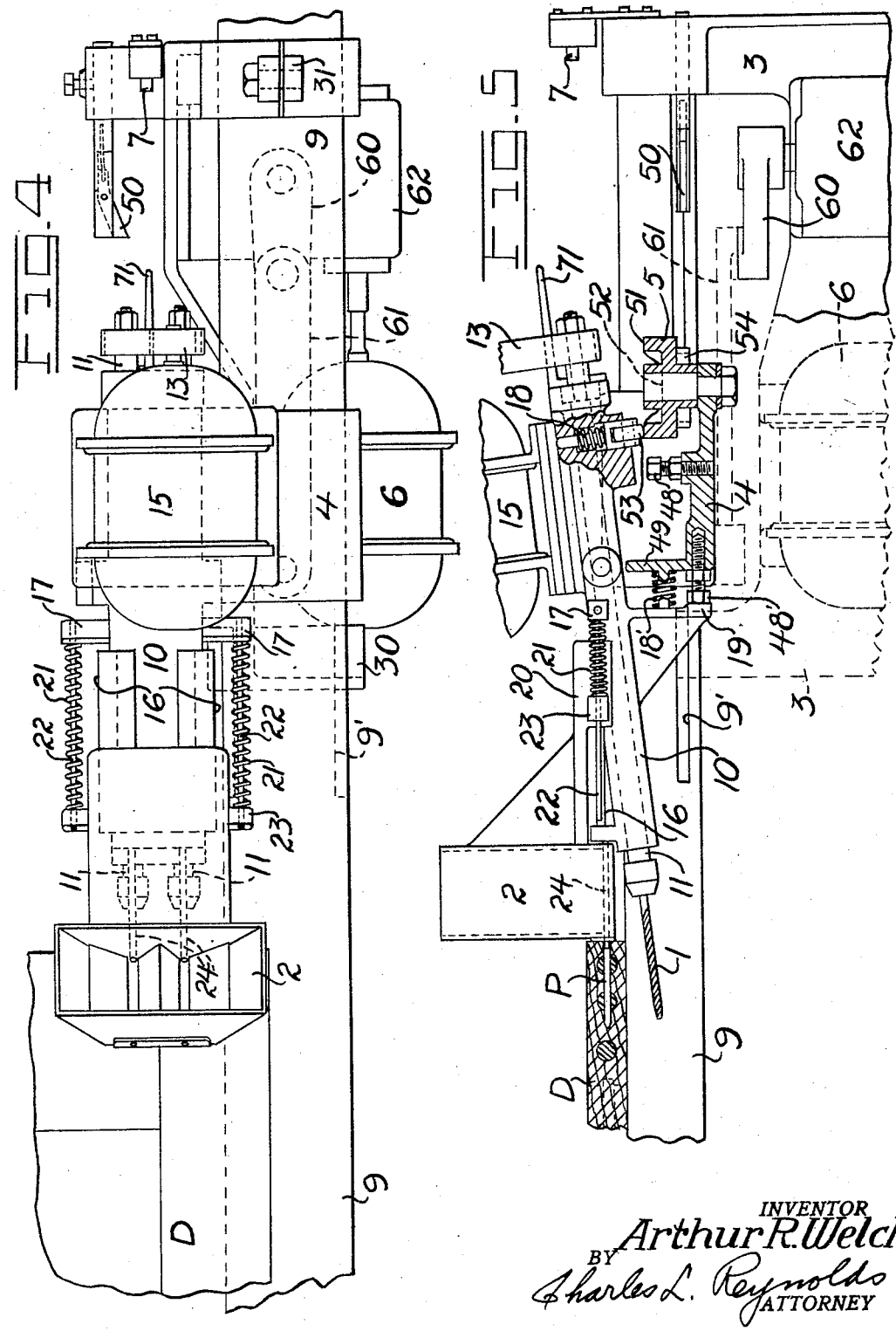

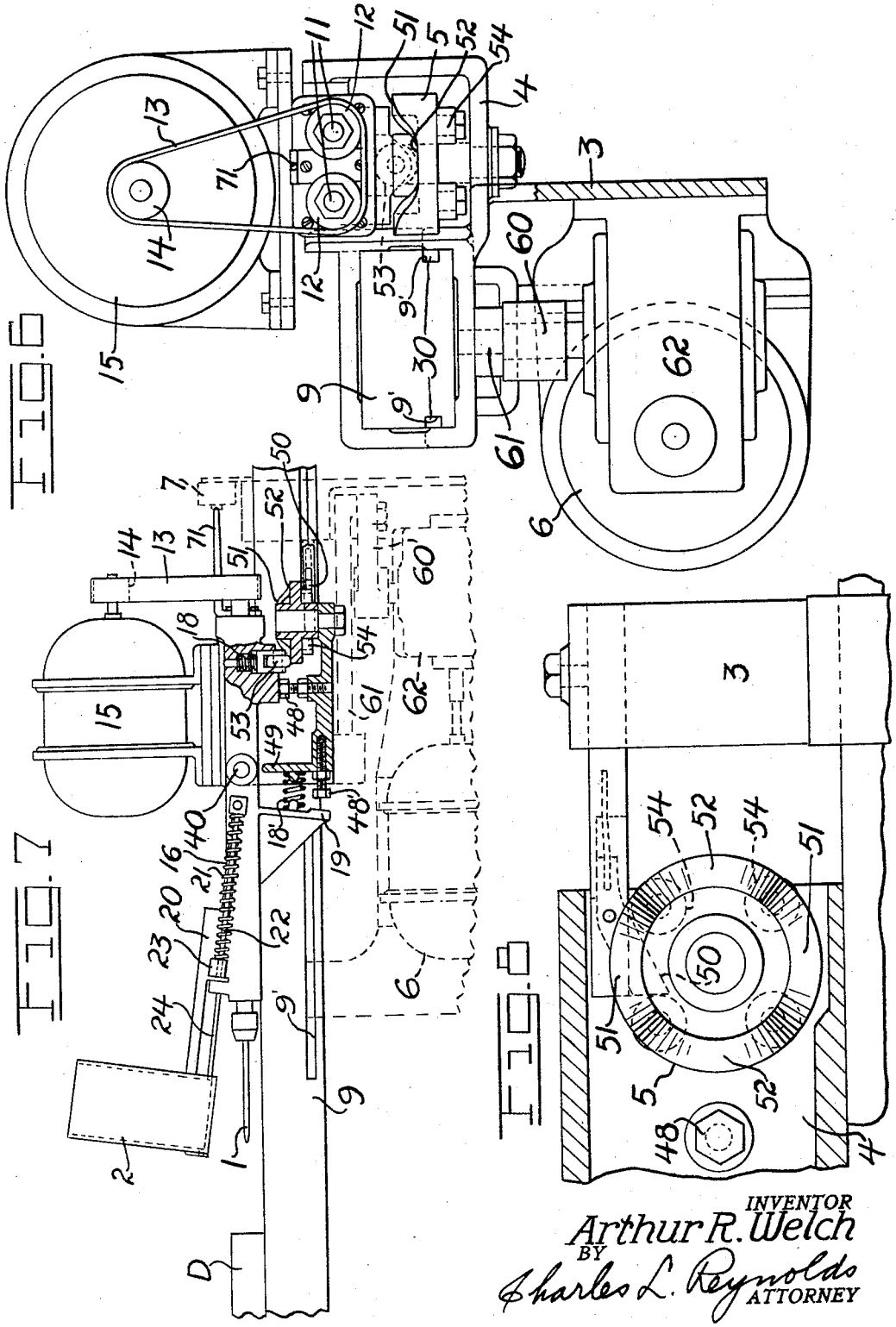

Patented May 16, 1933

1,909,791

UNITED STATES PATENT OFFICE

ARTHUR R. WELCH, OF HOQUIAM, WASHINGTON

DOWEL PINNING MACHINE

Application filed February 23, 1932. Serial No. 594,725.

My invention relates to the art of manufacturing doors. Doors are customarily made up from stiles spaced by rails at top and bottom, and with a suitable panel of simple or complex form in the rectangular frame thus formed. The rails and stiles are customarily joined by dowels previously secured in the rails and projecting from their ends, fitting into matching holes provided in the inner edges of the stiles. As explained in my copending application Serial No. 584,781, filed January 5, 1932, I insert pins through the rail and stile and into or through the joining dowels. Preferably these pins are inserted from the top and bottom end edges of the door, so that they do not mar the visible surfaces of the door, and so that they are the more strongly secured.

The present invention concerns a machine to do this dowel pinning operation at a time when the door is tightly clamped in the usual door clamp, and has for its primary object the provision of a machine which will accomplish the operation in conjunction with or attached to the ordinary door clamp.

It is another object of the invention to provide such a machine which is nearly or quite automatic, and which is tied up for operation with the clamp-operating means.

It is a further object to provide means which will prevent closing or opening of the door clamp while the pin-inserting mechanism and the drilling mechanism preceding the same are in operative relationship to the door.

It is an object to provide mechanism for the purpose indicated which can be attached to door clamps now in use with but slight changes in the clamps.

It is also an object to provide such mechanism which will be simple in construction and thoroughly rugged and reliable in operation.

My invention comprises the novel parts and the novel combination and arrangement thereof, as shown in the accompanying drawings, described in this specification, and as will be more particularly defined by the claims which terminate the same.

In the accompanying drawings I have shown my invention arranged in a form such as is now preferred by me.

Figure 1 is a general plan view of a door clamp having my invention associated therewith.

Figure 2 is a diagram of the electrical controls associated with my machine, the machine being shown in plan.

Figure 3 is a general elevation of the drilling and pin-inserting mechanism, shown in operative relationship to a clamp bar and a door.

Figure 4 is a general plan view of such mechanism.

Figure 5 is a general elevation, with parts in section and other parts omitted, showing the device at a later phase of its operation than is shown in Figure 3.

Figure 6 is a general end elevation of the machine, taken from the outer end.

Figure 7 is a part elevation and part section, on a vertical longitudinal plane, illustrating the parts in position at the beginning and end of a cycle.

Figure 8 is a horizontal section illustrating the intermittent feed means in feeding position.

The door clamp may conveniently consist of end frames 91 and 92 whereon are mounted for transverse movement the clamp jaws 9 and 90. These clamp jaws are opened and closed by right-and-left screws 93 threaded into nuts (not shown) secured to each of the jaws, these screws being rotated by a longitudinal shaft 94 in driving connection with the screws 93 or with members associated therewith. Rotation of the shaft in one direction accomplishes closing of the jaws, and its rotation in the opposite direction effects opening thereof. The direction of rotation can be controlled by forward and reverse clutch elements 95 and 96, respectively, driven by the belts 95' and 96' from the motor 99, and a complemental clutch element 97 is secured to rotate with the shaft 94, and may be engaged with one or the other of the clutch elements 95 or 96. Its engagement is controlled by suitable means such as the control lever 97'.

To accommodate doors of different widths of stile, it may be desirable to provide stop bars or ledges 130 adapted to engage the side edges of the stiles, these stop bars being supported by screws 131 threaded in a rotative nut 132 supported in brackets 133 upon the jaw 9 and 90, the nut being rotatable in common with all the other nuts by bevel gears 134, one of which in each pair is secured upon an adjusting shaft 135 whereon is a hand wheel 136. By these or like means the exact position of the outer edge of the stile, with respect to the inner edge of the clamping bar 9 or 90, may be determined. The reason for this will be more apparent as the description progresses.

At each corner of the door clamp, and supported upon the clamping bar, is a drilling and pin-inserting mechanism. To support the same, and to permit its adjustment endwise to accommodate doors of different heights or lengths, a frame 3 is provided, this having inwardly directed fingers 30 engageable within grooves 9' in the sides of the clamping bar 9, and being secured in adjusted position by a clamp at the opposite end of the frame, as indicated at 31. A carriage 4 is slidable relative to the frame 3, and while it might be supported upon the frame, it is simpler to permit it to slide directly upon the clamping bar 9. The means for accomplishing this movement of the carriage will be explained hereafter.

Upon the carriage, pivoted at 40, is a spindle body 10, wherein are journaled two spindle arbors 11 provided with chucks to receive drills 1 directed inwardly or toward the door D. At the outer end of the spindle body the arbors 11 project and have secured upon them sprocket wheels or pulleys 12, and a chain or belt 13, passing over a sprocket wheel or pulley 14 upon the shaft of a motor 15, passes about the wheels 12 to rotate the drills. By circuits to be described hereafter the motor 15 may be driven continuously to rotate the drills at all times, or may be started and stopped at will.

A dowel hopper 2 is conveniently supported from a slide 20 supported by guides 16 upon the spindle body 10. A spring 21, mounted upon a guide rod 22, bears upon a lug 17 upon the spindle body, the rod passing through a guiding ear 23 upon the slide 20, and the spring 21 bears upon this ear 23 and holds the slide and the associated pin hopper projected, as may be seen in Figure 3. A pin ejector 24 is supported upon the spindle body 10 projecting parallel to the guide 16 and entering the pin hopper 2, so that when the pin hopper and slide are moved to the right from the position shown in Figure 3, a pin will be projected from the hopper by the ejector 24. This position of the parts is shown in Figure 5.

Because of the position of the drills 1 and dowel hopper 2, one immediately above the other, they may be brought into registry with the door in turn, and by displacement, first one and then the other can be brought into registry therewith. Thus, upon advancing the slide 4 to the left from the position shown in Figure 7, the continuously rotating drills 1 are brought into engagement with the door D, and two holes are drilled, one in the stile and one in the rail, and through the dowels, as may be seen in Figure 3. Upon withdrawal of the drills to the right, and displacement of the spindle body by tilting it upon the axis 40, the ejector 24 and the pin hopper can be brought into registry with the holes thus bored, and upon again advancing the slide 4 to the left, the hopper 2 strikes the end of the door and stops, the ejector 24 continues to advance, and pins are ejected into the holes in the door, as may be seen in Figure 5.

Since it is desirable to space the pins equidistant from the joining edge of the stile and rail, and since the stiles may differ in width for different doors, yet the position of the drills relative to a vertical plane through the inner edge of its supporting bar 9 or 90 does not vary. Adjustment of the stops 130 to accommodate the different widths of stile will compensate for this, and the pins will always be substantially equidistant from the joining edge.

As a convenient means of accomplishing the tilting or displacement of the drills and dowel hopper referred to above, I may provide a rotary crown cam 5 supported upon the slide 4, cooperating with a dog 50 projecting from a portion of the frame 3, so that as the slide is reciprocated the cam 5 is rotated step by step, the different steps accomplishing the proper displacement of the drills and the pin hopper. Thus the cam may be provided with the high spots 51 and the low spots 52, and a cam follower 53 yieldably supported in the spindle body 10 bears upon this cam and controls the tilting of the spindle body. A spring 18 behind the cam follower, and a spring 18' between a web 19 of the spindle body and a similar web 49 of the slide, coupled with adjustable stops 48 and 48' upon the slide, exactly determine the two positions of the spindle body as it tilts from one to the other.

The slide is reciprocable lengthwise of the clamp bar 9 or 90. This may be accomplished by a crank arm 60 and link 61, the link being connected to the slide, and the crank arm being driven through a reduction gear within the casing 62, from a motor 6. Now as the slide 4 reciprocates, depending pins 54 upon the cam 5 are brought into contact with the fixed spring-held dog 50, which causes the cam to advance through 90°. This is the spacing provided between the high spots and low spots, and it follows that with each quarter rotation of the cam, the spindle body 10 is tilted from one position to another, and is tilted back again with the succeeding quarter rotation of the cam.

Insofar as the mechanical operation is concerned, the operation of the machine will now be clear. A door is put upon the clamp bar, the parts loosely assembled, and the clamp bars are closed through power supplied by the motor 99. When the door is drawn sufficiently tight, the closing action of the clamp bars is stopped, and by means which will be described hereafter it is preferred that this closing action be stopped by means which initiate the advance of the drills 1. These drills now advance, bore into the door, one drill of each pair into the rail and the other into the stile and into the joining dowel. Each set of drills operates independently of the drills at the other corners, so that should one meet greater resistance than the others, it will advance more slowly, and no harm can ensue. After the drilling operation is completed, the drill is withdrawn, the spindle body 10 is tilted and immediately comes forward again, with the ejector 24 now in alignment with the holes that have been drilled, and upon engagement of the end of the dowel hopper 2 with the end of the door, the dowel hopper is stopped, but the slide 20 and spring 21 permit the spindle body to continue its advance, compressing the spring until eventually the pins P are ejected and forced into the holes previously drilled by the drills 1. During this operation the drills 1 are depressed below the door so that they do not engage therewith. Now the dowel hopper is withdrawn, the spindle body 10 again tilts about its axis at 40, and parts are again in the position of Figure 7, ready to operate upon a fresh door. The clamping jaws are now opened through power supplied by the motor 99, the door is removed, and a new door is put into place to be operated upon as just described.

It will be evident that should the clamping jaws close or open while the drills are in the door, or while the pin is being inserted, there would be grave danger of damage, possibly wrecking the machine and probably injuring the attendant. Accordingly it is necessary to provide means to prevent any such occurrence and to permit operation of the clamping bars to open or to close only when the drills and associated parts are completely withdrawn. Such devices can conveniently be incorporated in electrical controls, best shown in Figure 2.

In association with each of the corner mechanisms for drilling and pin-inserting there is provided a switch 7, one side of all these switches being connected to a common line 70, and there being provided a member 71 supported upon the tiltable spindle body 10 which, at a certain time in the cycle of operation of the corner mechanism, opens the switch 7 associated therewith. This takes place only when the pin-inserting operation is completed and the mechanism has been withdrawn and is in position to commence a new drilling operation. There is also provided a further switch 8 and a device 81, likewise supported upon a tiltable spindle body 10, which will close at such a time, this being connected to leads 80 and 82. But one such switch 8 is provided in the arrangement illustrated, though a switch 7 is provided for each of the four corner mechanisms.

Referring now to Figure 2, we will assume that a new door has been placed in the clamp and we are ready to commence the clamping operation. Current is supplied from a three-wire circuit comprising the main leads A, B and C. Each of the motors involved is or may be a three-phase motor.

To start the motor 99 and thus initiate closing of the clamp bars 9 and 90 (provided the clutch members 95 and 97 are engaged), switch points at 83 are closed. Current now flows from the main wire A through the closed switch points at 83, along the lead 80, through the closed switch 8 (and this switch, it will be remembered, can only be closed when the corner mechanisms are completely withdrawn), back again by the lead 82 to the coil 84, and through this coil back to the main lead B, thus completing a circuit, and the energization of the coil closes all the switches at the station 85. Immediately current may pass directly from the main leads A, B and C to the motor 99, and current also passes by way of the lead 86, the closed switch at the station 85, the lead 87, the normally closed switch points 88, lead 80, the still closed switch 8, and back through the lead 82 to the coil 84. Thus the coil remains energized and holds all the switch points at 85 closed so long as the switch 8 is closed, and so long as the switch points at 88 remain closed. For an emergency stop, then, the circuit can be broken at 88, thus stopping the motor 99 and the movement of the clamping jaws, or, if the drills 1 move inward, the circuit is broken at the switch 8, and movement of the clamping jaws ceases.

So long, then, as the drills remain fully retracted, the clamping jaws can close through the action of the motor 99 and the clutch element 95, or if closed, the clamping jaws can open so long as the drills remain fully retracted, through energization of the motor 99 and operation of the reverse clutch element 96.

Current supplied to the motors 6 is controlled through a switch generally indicated at 100, including the terminal 101 in direct connection with the main lead A, the terminal 102 connected to the lead 104, the terminal 103 connected to the lead 105, and switch points 106 which are normally closed but which can be broken in an emergency to immediately de-energize the several motors 6. The common lead 70, previously referred to as running to one side of all the switches 7, is connected to the normally closed switch points at 106.

Closing of the switch points 103, 101 and 102 leads current from the main lead A through the lead 104 to a coil 145, and effects closing of all the switch points at the station 146. There are four such switch points at the station 106, each of these corresponding to one of the four corner mechanisms, and running to contactor stations at 107, 108, 109 and 110.

We may consider the station at 107 as being typical of the stations 108, 109 and 110. Upon energization of the coil at 145 and closing of the switch elements at 146, current may now pass through the momentarily energized lead 104 and the now energized lead 72 to a coil 73 at the station 107, and thence through a lead 74 back to the main line B. Accordingly, the coil at 73 is energized, and all the switch points at the station 107 are closed. The circuit to the motor 6 controlled by this particular station is immediately energized, and the slide 4 commences to advance. This movement very quickly enables the switch 7 to close, the switch points 103 and 101 and 102 being held in contact long enough to permit closing of the switch 7. Now, with the closing of the switch 7, current may pass from the main lead A by way of the lead 75, the closed switch at the station 107, the lead 76, the lead 105, the closed switch points at 106, lead 70, the particular switch 7, the lead 77, back to the coil 73 at the station 107, thence through the lead 74 and back to the main line B, thus continuing to energize the coil 73, though the coil 145 may now be de-energized. This maintains the switch points at 107 (and the same is true of the switch points at 108, 109 and 110) closed so long as the corresponding switch 7 is closed, and this switch 7 remains closed, it will be remembered, while the drilling mechanism is advancing, during its first withdrawal, while the pin hopper is advancing, and until the pin hopper has been completely withdrawn and the corner mechanism is in position to recommence its cycle. Only at this time is the circuit broken at the switch 7, and upon this occurring, the coil 73 is de-energized and the switches at 107 are broken, cutting off the supply of current to the motor 6 of this particular corner mechanism. At any time the opening of the switch points at 106 will de-energize all these motors 6.

By this arrangement each corner mechanism is advanced, retracted and tilted, again advanced in tilted position, retracted and tilted back, all independently of the other corner mechanisms, and eventually each de-energizes its contactor station, and the switch 8 being again closed, the clamping bars may be opened again, in the manner previously described, and the now completed door removed from the clamp.

It will be observed that the clamp continues to close until the closing of the switch points at 101, 102 and 103, initiating advance of the drills, opens the switch 8. This de-energizes the motor 99 and stops closing of the clamp. The device which controls starting of the drill's advance also controls stopping the movement of the clamp bars. At any time, however, the movement of the clamp bars can be halted by opening the switch at 106. The entire operation is automatic except for starting the different phases of the cycle, and one of these, the pin-inserting phase, automatically follows the drilling phase.

The drills, it will be remembered, are intended to be rotated continuously, and to this end current is supplied from the main line A through the lead 120, the switch points 121 and 122, upon closing the latter, the lead 123, past the normally closed switch points at 124, through the coil 125', and back by the lead 126 to the main line B. This closes all the switch points at the station 125, and upon release of the switch point 122, current now flows from the main line A by way of the lead 127, through the now closed switch at 125, through the lead 128, the normally closed switch points 124, the lead 123, the coil 125', and the lead 126, back to the main line B, thus retaining the switches at 125 closed, and feeding current continuously through the switch at this station to the several drill motors 15. They can all be stopped at any time—for instance, in an emergency—upon breaking the circuit by separating the switch points at 124. For further safety, thermo control elements are incorporated in the lines to the motors 15 which are running continuously, these being indicated at 129.

What I claim as my invention is:

1. In combination, door clamping jaws, means to close and to open the same, and means carried by the jaws to bore holes from the ends of the stiles and rails, into the same and the joining dowels, and to insert a retaining pin in the hole thus formed.

2. In combination, door clamping jaws, means to close and to open the same, and means operable only when the jaws are closed to bore holes from the ends of the stiles and rails, into the same and into the joining dowels, and to insert a retaining pin in the hole thus formed.

3. In combination, door clamping jaws, boring mechanism, pin supplying and driving mechanism, and cooperating means operable through a fixed cycle comprising (1) closing the jaws, (2) boring holes in the stiles and rails and into the joining dowels, (3) inserting retaining pins in the holes thus formed, and (4) opening the jaws.

4. In combination, door clamping jaws, means to close and open the same, and means to insert a retaining pin through each rail and each stile into the joining dowels, and control mechanism for preventing movement of either the clamping jaws or the pin inserting means while the other is moving.

5. In combination, door clamping jaws, means to close and open the same, means to insert a retaining pin through each rail and each stile into the joining dowels, and means to prevent operation of the latter means except when the jaws are closed.

6. In combination, door clamping jaws, boring mechanism, pin supplying and driving mechanism, cooperating means operable in succession to (1) close the jaws, (2) bore holes in the stiles and rails and into the joining dowels, (3) insert retaining pins in the holes thus formed, and (4) open the jaws, and means to prevent commencement of a later phase of the cycle until completion of the preceding phase.

7. In combination, door clamping jaws, individual means to (1) close the jaws, (2) bore holes in the stiles and rails and into the joining dowels, (3) insert retaining pins in the holes thus formed, and (4) open the jaws, means operable to initiate closing of the jaws, means to initiate the second and third phases, means controlled by the latter means to throw the jaw-closing means out of operation, and including means itself thrown out of operation only after the third phase has been completed, said jaw-closing means being disposed for operation upon completion of the third phase, to initiate the fourth phase.

8. In combination, door clamping jaws, means including an electric motor to close the jaws, drills movable to bore holes in the stiles and rails and into the joining dowels, and thereafter movable to withdraw the drills, means to insert retaining pins in the holes thus formed, means to effect the drilling, withdrawing, and inserting operations including motors and a switch in the circuit of each such motor, the inserting means being engageable with such switch upon completion of the inserting operation, to cut out the motors energizing the same, a switch in the circuit of the jaw-closing motors and a self-closing relay in circuit therewith, said switch being positioned to be closed by the drilling and inserting means upon completion of the inserting operation, and manual means to energize said self-holding relay when said latter switch is closed.

9. In combination, door clamping jaws, means including an electric motor to close the jaws, drills movable to bore holes in the stiles and rails and into the joining dowels, and thereafter movable to withdraw the drills, means to insert retaining pins in the holes thus formed, means to effect the drilling, withdrawing, and inserting operations including motors and a switch in the circuit of each such motor, the inserting means being engageable with such switch upon completion of the inserting operation, to cut out the motors energizing the same, a switch in the circuit of the jaw-closing motors and a self-closing relay in circuit therewith, said switch being positioned to be closed by the drilling and inserting means upon completion of the inserting operation, and to be opened to de-energize the jaw-closing motor when the drills advance towards the stiles and rails, and manual means to energize said self-holding relay when said latter switch is closed.

10. In a door clamp, door clamping jaws, means to close and open the jaws, drills supported at each corner of the clamp and directed inwardly, pin-inserting means likewise supported at each corner and adapted to insert a pin within holes bored in the rails and stiles, and into the joining dowels, and means to advance the drills to bore such holes, and to actuate the pin-inserting means.

11. In a door clamp, door clamping jaws, means to close and open the jaws, drills supported at each corner of the clamp and directed inwardly, pin-inserting means likewise supported at each corner and adapted to insert a pin within holes bored in the rails and stiles and into the joining dowels, and means individual to each corner mechanism to advance the drills to bore such holes, and thereafter to actuate the pin-inserting means.

12. In a door clamp, door clamping jaws, means to close and open the jaws, drills supported at each corner of the clamp and directed inwardly, pin-inserting means likewise supported at each corner and adapted to insert a pin within holes bored in the rails and stiles and into the joining dowels, means individual to each corner mechanism to advance the drills to bore such holes, and thereafter to actuate the pin-inserting means, and means operable only after all pins have been inserted to place the jaw opening means in operative condition.

13. In a door clamp, door clamping jaws, means to close and open the jaws, drills supported at each corner of the clamp and directed inwardly, pin-inserting means likewise supported at each corner and adapted to insert a pin within holes bored in the rails and stiles and into the joining dowels, means individual to each corner mechanism to advance the drills to bore such holes, and thereafter to actuate the pin-inserting means, and means to interdict operation of the jaw opening and closing means during operation of the drilling and pin inserting means.

14. In a door clamp, door clamping jaws, means to close and open the jaws, drills supported at each corner of the clamp and directed inwardly, pin-inserting means likewise supported at each corner and movable with the corresponding drills to register with holes from which the drills have been withdrawn, and means to advance the drills to bore holes in the adjacent rail and stile, and into the joining dowel, thereafter to withdraw the drills, and to displace them and bring the pin-inserting means into registry with the holes, and thereafter to insert the pins.

15. In a door clamp, door clamping jaws, means to close and open the jaws, drills supported at each corner of the clamp and directed inwardly, pin-inserting means likewise supported at each corner and movable with the corresponding drills to register with holes from which the drills have been withdrawn, a cam operable to advance the drills to bore holes in the adjacent rail and stile, and into the joining dowel, thereafter to withdraw the drills, and to displace them and bring the pin-inserting means into registry with the holes, and thereafter to insert the pins, an electric motor driving said cam, and a switch in the circuit to said motor, positioned to be engaged by a device associated with the pin-inserting means following completion of the pin-inserting operation, to be opened thereby and to stop the motor and cam.

16. In a door clamp, door clamping jaws, means including an electric motor to close and open the jaws, a drill supported at a corner of the clamp and directed inwardly, pin-inserting means likewise supported at the corner and movable with the drills to register with holes from which the drills have been withdrawn, means to advance the drills to bore holes in the adjacent rail and stile, and into the joining dowels, thereafter to withdraw the drills, and to displace them and bring the pin-inserting means into registry with the drilled holes, and thereafter to insert the pins, and a switch in a circuit controlling said motor, positioned to be engaged by a device associated with the pin-inserting means following completion of the pin-inserting operation, to be closed thereby, and to be opened upon advance of the drills to enable starting of the motor and closing or opening of the clamp only when the drills are withdrawn.

17. In a door-making machine, in combination, rotative drills, a pin delivering means, means to advance in succession the drills to drill holes in the door, and the pin delivering means to insert pins in such holes, and means to displace the drills following the drilling operation, and the pin delivering means, to bring the latter into registry with the holes bored.

18. In a door-making machine, in combination, rotative drills, a pin delivering means, means to advance in succession the drills to drill holes in the door, and the pin delivering means to insert pins in such holes, and means to displace the drills following the drilling operation, and the pin delivering means, to bring the latter into registry with the holes bored, and to return the parts to their original position following the pin-inserting operation.

19. In a door machine, in combination, rotative drills, a pin delivering means, a common support for the drills and pin delivering means, means to move said support to align the drills with the door or to align the pin delivering means with the holes bored therein by the drills, and means to advance the support to engage the then aligned member with the door.

20. In a door machine, in combination, rotative drills, a pin hopper, a pin ejector, a common support for the drills and pin hopper and ejector but permitting relative movement of the hopper and ejector generally longitudinally of the drills, means to move said support to align the drills with the door or to align the pin hopper and ejector with the holes bored therein by the drills, and means to advance the support to engage the drills, when they are in alignment, with the door, and the hopper and ejector, when the latter is in alignment, with the holes bored, the continued advance of the ejector ejecting pins into such holes.

21. In a door machine, in combination, rotative drill arbors, a spindle body in which the drill arbors are journaled, a pin hopper supported upon the spindle body to slide at an angle to the drill arbors, a pin ejector supported from the spindle body, parallel to the direction of sliding of the hopper, and received within the latter, a slidable carriage, the spindle body being tiltably supported thereon to alternately align the drill arbors and the ejector with the door, means to reciprocate said carriage, and means operable with each complete reciprocation of the carriage to tilt the spindle body from one position to the other.

22. In combination with the jaw of a door clamp, a frame secured thereon, a carriage slidable lengthwise of the jaw, a spindle body pivotally supported upon said carriage, parallel drill arbors journaled in said spindle body, a pin hopper, a slide supporting said pin hopper for movement lengthwise of the spindle body, at an angle to the axes of the drill arbors, pin ejectors supported on the spindle body and received within the pin hopper, parallel to its direction of sliding, means to reciprocate said carriage and associated parts, and means to oscillate the spindle body as it is reciprocated, to align the drill arbors and then the pin ejector with a door rail and stile held by the clamp jaw.

23. In combination, door clamping means, means for closing and opening said clamping means, and means including boring mechanism and pin inserting mechanism, movable toward the door when held in clamped position, through a fixed cycle including the steps of (1) boring holes into such door, and (2) thereafter inserting retaining pins in the holes thus formed.

Signed at Seattle, King County, Washington this 15th day of February, 1932.

ARTHUR R. WELCH.